US008354086B2

(12) United States Patent
Murray et al.

(10) Patent No.: US 8,354,086 B2
(45) Date of Patent: Jan. 15, 2013

(54) CAPTURED $CO_2$ FROM ATMOSPHERIC, INDUSTRIAL AND VEHICLE COMBUSTION WASTE

(76) Inventors: Kenneth D. Murray, Huntington, VT (US); Katherine A. Murray, Burlington, VT (US)

(*) Notice: Subject to any disclaimer, the term of this patent is extended or adjusted under 35 U.S.C. 154(b) by 50 days.

(21) Appl. No.: 13/075,438

(22) Filed: Mar. 30, 2011

(65) Prior Publication Data

US 2011/0174196 A1 Jul. 21, 2011

Related U.S. Application Data

(63) Continuation of application No. 13/073,175, filed on Mar. 28, 2011, now Pat. No. 8,211,394, which is a continuation of application No. 12/668,556, filed as application No. PCT/US2009/065114 on Nov. 19, 2009, now Pat. No. 7,914,758.

(60) Provisional application No. 61/116,102, filed on Nov. 19, 2008.

(51) Int. Cl.
*B01D 53/62* (2006.01)
*B01D 53/78* (2006.01)
(52) U.S. Cl. ........ 423/220; 423/225; 422/120; 422/122; 422/171; 422/176; 106/705
(58) Field of Classification Search .................. 423/220, 423/225; 422/120, 122, 171, 176; 106/705
See application file for complete search history.

(56) References Cited

U.S. PATENT DOCUMENTS

| 2005/0132883 A1* | 6/2005 | Su et al. .......................... 95/235 |
| 2008/0138265 A1* | 6/2008 | Lackner et al. ................ 423/224 |
| 2011/0059000 A1* | 3/2011 | Constantz et al. ............ 423/232 |
| 2012/0003722 A1* | 1/2012 | Polak et al. ................ 435/257.1 |

* cited by examiner

*Primary Examiner* — Timothy Vanoy
(74) *Attorney, Agent, or Firm* — Stites & Harbison PLLC; Douglas E. Jackson

(57) ABSTRACT

A $CO_2$ control device and method for capturing $CO_2$ from fluid flow, including: a flow-through apparatus and an $CO_2$ absorbing filter treated with an alkaline material which is housed within the flow-through apparatus. The flow-through apparatus receives fluid flow and the $CO_2$ from the fluid flow is absorbed by the $CO_2$ absorbing filter. The absorbed $CO_2$ is converted into $CaCO_3$ which is combined with volcanic ash to form a useful cement material.

21 Claims, 11 Drawing Sheets

| | | |
|---|---|---|
| 3.5m | ▨▨▨▨ | FILTER CO$_2$ |
| 3m | ▨▨▨▨ | FILTER FLY ASH |
| 2m | ▯ ▯ ▯ ▯ ▯ ▯ | HEAT EXCHANGER x2 |
| 1m, 1.5m | ▭ | CATALYST, FUEL |
| | | FUEL, COMBUSTION |

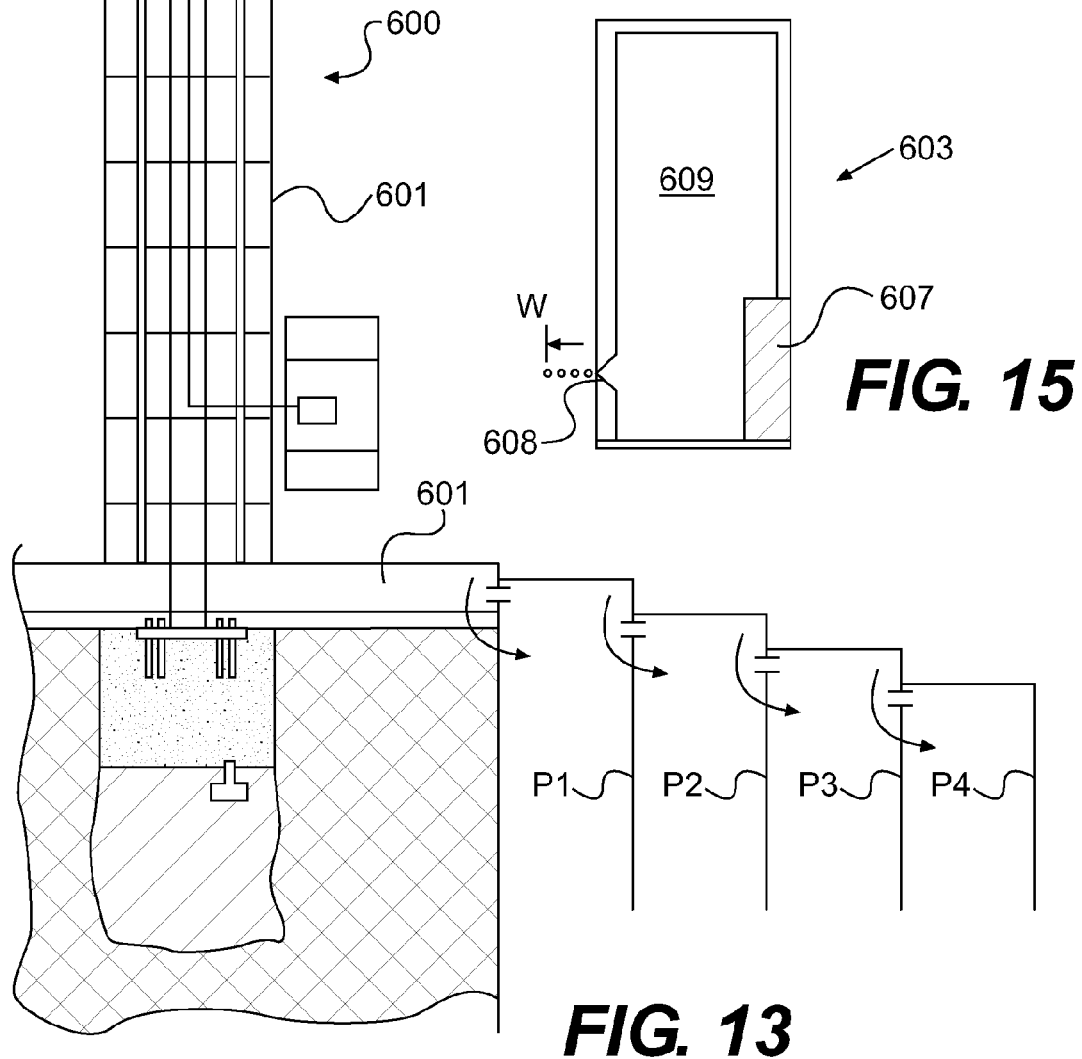

CAPTURED CO₂ FROM ATMOSPHERIC, INDUSTRIAL AND VEHICLE COMBUSTION WASTE

CROSS REFERENCE TO RELATED APPLICATIONS

This application is a continuation of application Ser. No. 13/073,175 filed Mar. 28, 2011 now U.S. Pat. No. 8,211,394; which is a continuation of application Ser. No. 12/668,556 now U.S. Pat. No. 7,914,758, which is the National Stage of International Application No. PCT/US2009/065114, filed Nov. 19, 2009 (which is hereby incorporated by reference); both of which claim the benefit of Provisional Application Ser. No. 61/116,102, filed Nov. 19, 2008 (which is hereby incorporated by reference).

BACKGROUND OF THE INVENTION

Filtration systems of carbon dioxide ($CO_2$) via chemical absorption can harness the organic energy potential of $CO_2$ by decreasing or eliminating its emission into the atmosphere and utilizing it safely for alternative means. Methods of using available energy sources to absorb $CO_2$ from the atmosphere, from industrial flue gas and from motor vehicle exhaust emissions for carbon fixation are described here. Waste carbon and combustion products are chemically treated to form useful materials which contain $CO_2$ in a solidly fixed state, harmless to the environment. One such material is a $CO_2$-contained adhesive.

The burning of biomass and fossil fuels continually increases greenhouse gas concentrations in atmospheric air. In particular, the greenhouse gas carbon dioxide is one of the most substantial contributors to the significantly increasing proportions of these gases in the air. These anthropogenic $CO_2$ contributions to the atmosphere have increased 100 parts per million (ppm) since the Industrial Revolution. Current global $CO_2$ levels are about 365 ppm.

Public and scientific communities now focus on the potentially dangerous effects of $CO_2$-induced climate change. Atmospheric measurements indicate a continuous annual increase of $CO_2$ in the middle layers of the troposphere. This research, conducted by Keeling and Whorf, at the Scripps Institute of Oceanography, Mauna Loa Observatory in Hawaii, produced the longest-ever continuous recording of $CO_2$ readings in the atmosphere. Their records indicate a 19.4% (mean) annual increase from 1958 to 2004.

In addition to global warming cycles largely attributed to this heat blocking molecule, recent studies of oceanic acidification from $CO_2$ absorption indicate a steady lowering of normal off-shore pH values and provide evidence for upwelling of acidified water onto the western North American continental shelf. In a 2008 article in *Science*, Feely, et al, show the negative effects of this acidification on marine animals by reducing their rate of calcification.

Attempts to mitigate carbon emissions today include wet scrubbers at coal-fired power plants and catalytic converters on motor vehicles. These methods, as well as others, adopted in the United States for decades, do work. The exception, however, is that they indicate moderate effects, and they only treat emissions at the point of production. Effectiveness in carbon control is a key requirement for international acceptance standards for motor vehicle emissions and industrial pollution control technologies worldwide.

While significant work is needed to evolve source-driven solutions, new open air carbon capture methods are also required as the greenhouse problem and its effects grow and become more significant with time. Here, we disclose several embodiments of methods for both carbon capture and storage in both cases.

According to one aspect of the present invention, in the case of motor vehicles, an active chemical $CO_2$-control device takes advantage of the engine-derived pressure pulses exiting from stock exhaust systems. The pressure pulses either increase or decrease in their frequency corresponding with the engine's revolutions per minute (RPMs). To keep the exhaust flowing freely and preventing unwanted restrictions, the $CO_2$ control device is designed to directly push exhaust straight through with minimal to no interruptions. The toroidal exhaust energy is received by the $CO_2$ absorption material along the cylinder wall of the flow-through apparatus. Each pulse of energy-containing combustion gases contacts the packing material, and discharges a portion of pollutants with each event.

The packing material in the expansion chamber is a high temperature ceramic woolen matrix containing silicon. It is treated with a mild alkaline and held in place by a smoothly louvered stainless steel insert, which separates the flow path from the filter. A pH indicator in the filter housing subsequently reads the changing acidic values after $CO_2$ saturation. Spent filter packing material can be recycled and the replacement filters are easily installed and snap back into the chamber. Filter life is short and can be measured out in months. The amount of $CO_2$ captured by each filter can also be measured easily for carbon credits and/or rebate systems.

The filter, now containing $CO_2$ and other contaminants, is then chemically processed to prevent sequestering storage problems and potential problems in the future from $CO_2$ re-entering the earth's systems: biosphere, geosphere, atmosphere, etc.

According to other aspects of the present invention, Carbon dioxide filtration systems from chemical absorption are powered by wind, wave, pressure, solar, and convection. They share similarities in that they carry potential for creating alternative energy sources when combined with off-the-shelf, readily available materials and products. The structures, comprised of conduits of 'forced air', contain carbon dioxide for additional carbon-extraction processes. Furthermore, the captured carbon is used to assemble a useful material.

In certain known technology for treating high concentrations of carbon in flue stack emissions, the carbon is first absorbed by water and a weak, basic hydroxyl solution in a short-term process. This reaction is established and common. A weak solution of aqueous sodium or potassium hydroxide alters when the slightly basic regime increases in acidity as the $CO_2$ rapidly absorbs from the air. Then, by addition of calcium hydroxide, a calcium carbonate solid precipitate forms due to the presence of $CO_2$ now in solution.

In an effort to reduce energy requirements, and according to one aspect of the present invention, a cleaner alternative process for $CO_2$ collection is achieved by precipitating calcium carbonate directly by mixing an aqueous solution of calcium chloride ($CaCl_2$) with an aqueous solution of sodium hydroxide (NaOH).

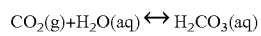

$$CO_2(g) + H_2O(aq) \leftrightarrow H_2CO_3(aq)$$

In the reaction above, equilibrium is established between the dissolved carbon dioxide and carbonic acid. Subsequently, carbonic acid dissociates in two steps:

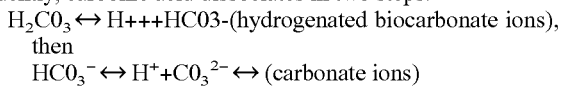

$H_2CO_3 \leftrightarrow H^+ + HCO_3^-$ (hydrogenated biocarbonate ions), then $HCO_3^- \leftrightarrow H^+ + CO_3^{2-} \leftrightarrow$ (carbonate ions)

Adding aqueous calcium hydroxide, Ca(OH)$_2$(aq), to the calcium ion, Ca$^{2+}$ (aq), plus the carbonate ion CO$_3^{2-}$ (aq), produces:

$$H_2CO_3(aq) + 2KOH \rightarrow K_2CO_3 + 2H_2O_3,$$

or by using potassium hydroxide as substitute:

K$_2$CO$_3$ or Na$_2$CO$_3$+Ca(OH)$\rightarrow$CaCO$_3$(s) (calcium carbonate precipitate)+2NaOH (or KOH).

The collected CO$_2$ with calcium carbonate is further processed by the addition of ground pozzolana, a volcanic ash originally used by the Romans, which is composed of siliceous and aluminous material from the Mount Vesuvius region in Pompeii, Italy.

The application here, for a similar glassy beaded waste material, such as common fly ash, is to capture CO$_2$ and form a useful product which contains CO$_2$ in a solidly fixed state—harmless to the environment. The CO$_2$ adhesive material, as disclosed, contains cement-like properties. The precipitate CaCO$_3$ (limestone) plus a volcanic ash (used instead of sand) eliminates the energy wasteful, high-temperature process of formulating conventional cement. The heating step required for manufacturing generic cement results in a massive release of CO$_2$ into the atmosphere. With volcanic ash, nature has already provided the heat.

Limestone/carbon dioxide slurry in combination with a clay-like volcanic ash hardens under water. Either fresh or salt water will yield similar results. The chemistry of combining pozzolana with limestone has been previously described by the Roman Emperor Augustus in the 5th Century BC.

According to still further aspects of the present invention for low concentrations of carbon in remote locations, atmospheric air-trapped CO$_2$ is reclaimed continuously. Calcium carbonate precipitates by mixing an aqueous solution of calcium chloride (CaC1) with an aqueous solution of sodium hydroxide (NaOH) for trapping CO$_2$ over time. Wind-driven venturi structures, a consequence of Bernoulli's principle, involve air flow entering into constricted sections of tubing at points where velocity increases and pressure becomes sub-ambient. Conversely, as tube diameters expand, pressure increases as air flow velocity slows. Similar reaction vessels follow the venturi model and take advantage of wind and wave energy.

In the case of wave power, there are several categories already developed which generally are location-dependent and used in generating electricity. For example, one method for shoreline operation is the oscillating water column.

BRIEF SUMMARY OF THE INVENTION

In accordance with one aspect of the present invention, a CO$_2$ control device for capturing CO$_2$ from a fluid flow, includes: a flow-through apparatus; and a CO$_2$ absorbing function using an alkaline material and housed within the flow-through apparatus; wherein the flow-through apparatus receives the fluid flow; and wherein CO$_2$ from the fluid flow is absorbed.

In accordance with other aspects of the present invention, a method of capturing CO$_2$ from fluid flow of exhaust from a vehicle or other sources of CO$_2$ includes the steps of: a) providing a CO$_2$ control device, the CO$_2$ control device comprising: a flow-through apparatus; and an CO$_2$ absorbing filter treated with an alkaline material and housed within the flow-through apparatus; b) receiving the fluid flow with the CO$_2$ control device; and c) absorbing the CO$_2$ from the fluid flow with the CO$_2$ absorbing filter.

In accordance with another aspect of the present invention, the method of storing captured CO$_2$ from fluid flow of exhaust from a vehicle or other sources of CO$_2$ includes the steps of: a) providing a CO$_2$ control device, the CO$_2$ control device comprising: a flow-through apparatus; and an CO$_2$ absorbing filter treated with an alkaline material and housed within the flow-through apparatus; b) receiving the fluid flow with the CO$_2$ control device; c) absorbing the CO$_2$ from the fluid flow with the CO$_2$ absorbing filter; d) converting the absorbed CO$_2$ in the CO$_2$ absorbing filter into CaCO$_3$; and e) combining the converted CaCO$_3$ with volcanic ash for use as a useful cement material.

Other features and advantages of the present invention are stated in or apparent from detailed descriptions of presently preferred embodiments of the invention found hereinbelow.

BRIEF DESCRIPTION OF THE SEVERAL VIEWS OF THE DRAWINGS

FIG. 13 is a schematic view of a wind tower structure that uses solar power for trapping CO$_2$ from atmospheric air.

FIG. 14 depicts an exemplary CO$_2$ filter for use in the structure of FIG. 13.

FIG. 15 depicts an exemplary drop generator for use in the structure of FIG. 13.

DETAILED DESCRIPTION OF THE INVENTION

One embodiment of the present invention is related to CO$_2$ control devices that capture carbon dioxide from vehicle emission waste. New government regulations are being sought to increase fuel efficiency of vehicles. For the first time ever, U.S. federal vehicle standards will require cuts in carbon dioxide and other greenhouse gases tied to global warming. A goal of these regulations is to reduce the consumption of oil. In turn, the improved fuel efficiency will reduce and limit the amount of carbon dioxide emitted into the atmosphere. In fact, government officials have announced that automakers will have to improve car and light truck mileage by 30% starting in 2016 to reduce new vehicle carbon emissions by 30 percent. The new requirement is estimated to save 1.8 billion barrels of oil through 2016 and cut greenhouse gas emissions by more than 900 million tons, the equivalent to shutting down 194 coal plants. Additionally, with an increasing awareness on climate change or global warming, it is desirable to further reduce the amount of $CO_2$ being emitted from the exhaust of vehicles. It is further desirable to reduce the amount of $CO_2$ being emitted without increasing the net levels of atmospheric $CO_2$.

Figure 1:
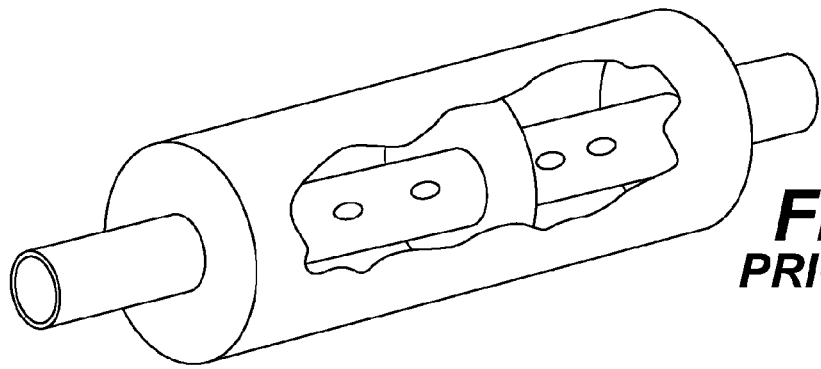
FIG. 1 is a perspective view with a cut-out showing the interior of a prior art muffler.

The vehicle exhaust exits a muffler prior to entering the atmosphere. A typical prior art, low-backpressure muffler for a vehicle, as shown in FIG. 1, includes a flow-through apparatus. The flow-through apparatus has a straight-through flow tube of constant diameter and cross-section, two end plates mounted to the flow tube, an outer shell mounted about the flow tube and extending the space between the end plates, and a series of perforations located on the tube within the outer shell. The muffler also includes a plate placed within the outer shell to divide the area defined within the outer shell into two cavities. This configuration does not restrict the flow of the exhaust gases resulting in no loss of power for the engine.

Figure 2:
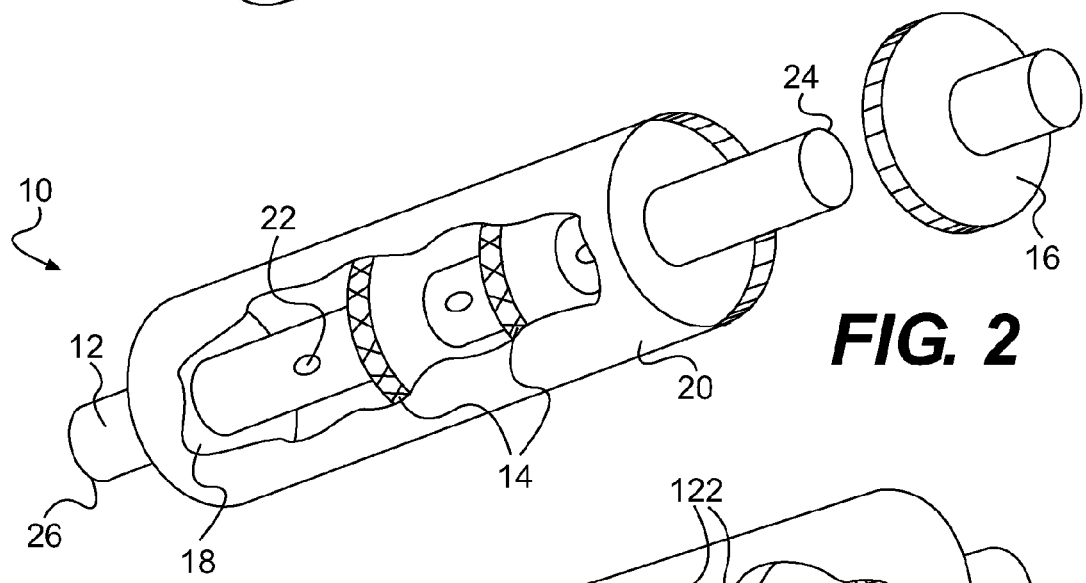
FIG. 2 is a perspective view with a cut-out of an exemplary carbon dioxide control device according to one embodiment of the present invention.
Figure 3:
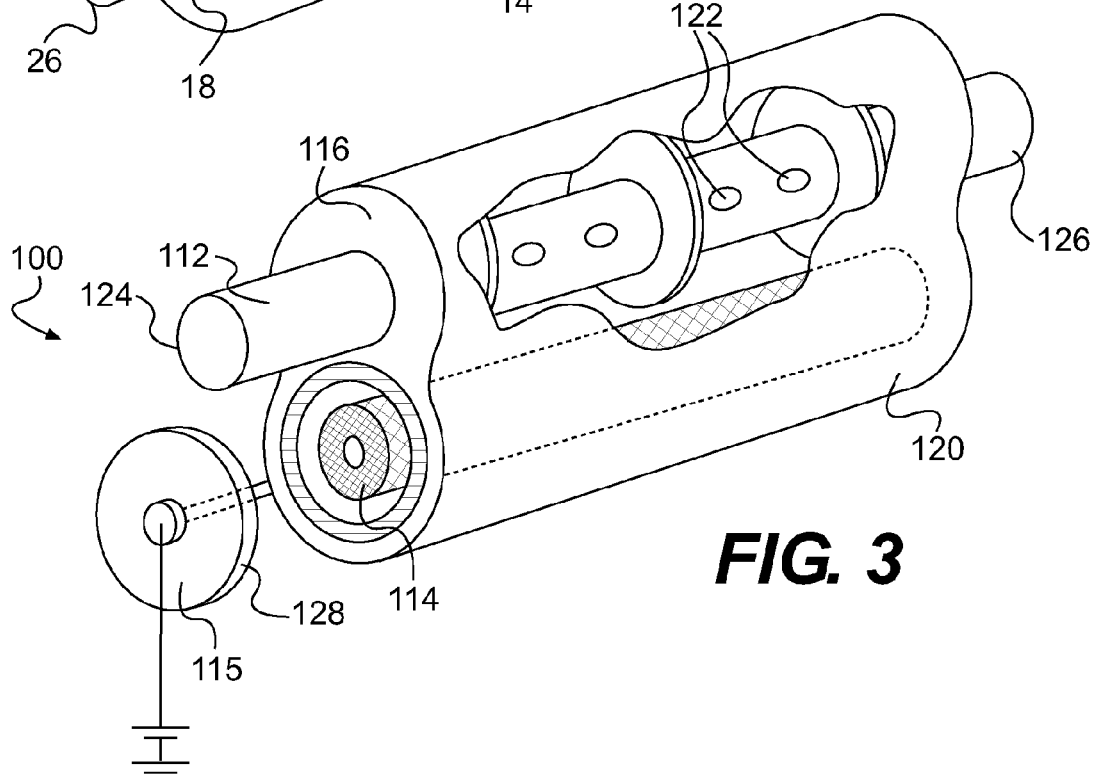
FIG. 3 is a perspective view with a cut-out of another exemplary carbon dioxide control device according to another embodiment of the present invention.

With reference now to FIGS. 2 and 3 of the drawings, in which like numerals represent like elements, FIG. 2 depicts a carbon dioxide ($CO_2$) control device 10 in accordance with one embodiment of the present invention. The control device 10 includes: a flow-through apparatus having a straight-through flow tube 12 of constant diameter and cross-section, two end plates 16, 18, mounted to the flow tube 12, an outer shell 20 mounted about the flow tube 12 and extending the space between the end plates 16, 18, and a plurality of perforations 22 located on the flow tube 12 and within the outer shell 20; and a $CO_2$ absorbing filter 14.

One end 24 of the flow tube 12 is in fluid communication with and receives exhaust from a vehicle's engine (not shown). The vehicle exhaust exits the distal end 26 of the flow tube 12 after a substantial amount of the exhausted $CO_2$ has been captured by the filter 14. The cover 16 can be removed from the control device 10 to provide access to the filters for maintenance or replacement.

In this exemplary control device 10, the $CO_2$ absorbing filter 14 is housed within the outer shell 20 and is treated with an alkaline material. The filter 14 is a high temperature ceramic-woolen matrix in a structured packing containing silicon, stainless steel, and the alkaline material.

The structured packing includes a material that withstands heat and fixates $CO_2$ as a carbonate solid; thereby capturing and safely storing greenhouse gas. This material includes alkali metals (e.g., sodium and potassium) and alkaline earth metals (e.g., calcium). It should be noted that other carbonate sources can be used and are within the spirit and scope of the present invention. For example, magnesium silicate is desirable considering the abundance of the mineral; however, the process to extract magnesium oxide (MgO) from the silicates for carbonization is heat intensive. Low energy, low heat processes considered herein are readily available salts and sufficient ions from dissolved salts. Magnesium is available as a dissolved salt in river water from chemical weathering of rocks. Chalk contains some magnesium calcite as well as CaO, silica, alumina, iron, phosphorus, and sulfur. These chalk concentrates were absorbed by and accumulated in plankton skeletons. They reflect the seawater composition during the Cretaceous Period which mirrors modern ocean chemistry. Also, seawater (neat or spiked with bases) readily dissolves $CO_2$.

Further, there are two round $CO_2$-absorbing filters 14 placed in series within the outer shell 20. The filters 14 are held in place by a smoothly louvered stainless steel insert, which separates the flow path from the filters 14. The two filters 14 divide the area defined within the outer shell 20 into multiple cavities.

In use, vehicle exhaust enters the control device 10, comes into contact with the filters 14 where $CO_2$ is absorbed, and the remaining exhaust exits the distal end 26 of the flow tube. This configuration of the control device 10 takes advantage of the engine-derived pressure pulses entering the control device 10. For example, the engine waste energy which would otherwise be lost to the atmosphere is transformed to do low energy work. The force and heat of the exhaust, along with its pollution content, act on the device/filter because exhaust has mass, velocity, and therefore momentum. Momentum is conserved as collisions occur within the device/filter/pipe system. The impulse of collisions is radial along the path of the pipe the exhaust is designed to travel. The impulse is equal to the change in momentum at points such as louvers, perforations, baffles, filters, and the walls of the pipes (more so if curved). The impulse advantage is the product of the force of exhaust acting on the filter at impact points and the time during which the action takes place.

For extended filter/exhaust contact dwell time, one embodiment has a sine-wave series of filters placed at the crest and trough of each wave period (impulse points). This curvilinear structure (not shown) allows gas-permeable filtration in series along a pipe-wave configured within a larger pipe. The structure is desirable without flow restrictions and where appropriate; for example, on diesel generators wherein $CO_2$ filters share the same conduit with heat-capture pipes. This embodiment performs double-duty in polar climates where heat conservation is critical for all systems and in this case the otherwise wasted heat becomes useful to do low energy work. A flow-through and flow-around filter system offers even more filter surface area exposure; however, the number of filters, the shape of the filters, and the placement of the filters within the outer shell can be varied depending on the particular application without departing from the spirit or scope of the present invention.

Also, the cross-section of the control device 10 is preferably round, but may be also ovoid, square, or rectangular. Further, the filter can be doubled, trebled, in series, or chambered parallel to the flow of exhaust or at 90 degrees to the flow being space-appropriately arranged without departing from the spirit or scope of the present invention.

Indeed, as shown in FIG. 3, another exemplary $CO_2$ control device 100 demonstrates an alternative configuration. Similar to the exemplary control device 10 discussed above, this control device 100 includes: a flow-through apparatus having a straight-through flow tube 112 of constant diameter and cross-section, two end plates 116, (other end plate not shown) mounted to the flow tube 112, an outer shell 120 mounted about the flow tube 112 and extending the space between the end plates 116 (other end plate not shown), and a plurality of perforations 122 located on the flow tube 112 and within the outer shell 120; and a $CO_2$ absorbing filter 114. One end 124 of the flow tube 112 is in fluid communication with and receives exhaust from a vehicle's engine (not shown). The vehicle exhaust exits the distal end 126 of the flow tube 112 after a substantial amount of the exhausted $CO_2$ has been captured or absorbed by the filter 114.

In contrast with the control device 10 discussed above, this exemplary control device 100 has a figure-eight cross-section. More specifically, the outer shell 120 is double-chambered and is shaped to receive a flow tube 112 and a tubular filter 114 placed at an offset and parallel with the flow tube 112. This configuration allows for a different type and size of filter to be placed within the exemplary control device 100. In addition, the figure-eight concept features filter-well housing accessibility for change-out maintenance. The double-chambered system has the added surface area useful for gas expansion, for heat dissipation, and for condensation containment. The bottom portion of the figure-eight can be even more pronounced to accommodate additional useable space. The additional space could allow room for a baffle plate or plates to be positioned between the filter chamber and the pipe chamber.

The advantages of a baffle plate or plate's in-series are for high performance vehicles needing heat exchangers and mist eliminators, although baffle plate systems do not restrict gas flow. The filter 114 is held in place by a smoothly louvered stainless steel insert. Further, a cover 115 placed on a distal end plate 116 of the exemplary device 100 allows the filter 114 to be readily accessed for removal and replacement. In use, capturing $CO_2$ from vehicle exhaust includes the steps of providing a $CO_2$ control device, receiving the exhaust with the $CO_2$ control device, and absorbing the $CO_2$ from the exhaust with the $CO_2$ absorbing filter.

It is preferable that a plurality of pH indicator beads 128 are placed within the cover 115. Because $CO_2$ is acidic, it will lower the pH level in the filter. Thus, by measuring the pH level of the filter 114, and the amount of $CO_2$ contained in the filter, the remaining filter life can be quantified. The pH level can be determined by a visual inspection of the pH indicator beads 128. After the $CO_2$ absorbing filter is substantially saturated with $CO_2$, the spent $CO_2$ absorbing filter is replaced. Once the filter is substantially saturated with $CO_2$, the filter is removed from the vehicle. The $CO_2$ is converted into calcium carbonate ($CaCO_3$), which is then combined with volcanic ash for use as a cement material.

To keep the exhaust flowing freely and preventing unwanted restrictions, the $CO_2$ control device is designed to directly push exhaust straight through with minimal to no interruptions. The toroidal exhaust energy is received by the $CO_2$ absorption material along the cylinder wall of the flow-through apparatus. Each pulse of energy-containing combustion gases contacts the packing material, and discharges a portion of pollutants.

Spent filter packing material can be recycled and the replacement filters are easily installed and placed back into the control device. The amount of $CO_2$ captured by each filter can be measured for carbon credits or rebate systems. The filter, now containing $CO_2$ and other contaminants, is then chemically processed to prevent sequestering storage problems and potential problems in the future from the $CO_2$ re-entering the biosphere, geosphere, atmosphere, etc. For example, carbon dioxide filtration systems share similarities in their potential for creating alternative energy sources when combined with off-the-shelf, readily available materials and products. Furthermore, the captured carbon is used to assemble a useful material.

One method to process the collected $CO_2$ is to precipitate calcium carbonate directly by mixing an aqueous solution of calcium chloride ($CaCl_2$) with an aqueous solution of sodium hydroxide (NaOH).

$$CO_2(g)+H_2O(aq) \leftrightarrow H_2CO_3(aq)$$

In the above reaction, equilibrium is established between the dissolved carbon dioxide and carbonic acid. Subsequently, carbonic acid dissociates in two steps:
1) $H_2CO_3 \leftrightarrow H^+ + HCO_3^-$ (hydrogenated bicarbonate ions); and
2) $HCO_3^- \leftrightarrow H^+ + CO_3^{2-} \leftrightarrow$ (carbonate ions)

Adding aqueous calcium hydroxide, $Ca(OH)_2(aq)$, to the calcium ion, $Ca^{2+}$ (aq), plus the carbonate ion $CO_3^{2-}$ (aq), produces:

$$H_2CO_3(aq)+2KOH \rightarrow K_2CO_3+2H_2O_3,$$

or by using potassium hydroxide as a substitute:
$K_2CO_3$ or $Na_2CO_3+Ca(OH)_2 \rightarrow CaCO_3(s)$ (calcium carbonate precipitate)$+2NaOH$ (or KOH)

The collected $CO_2$ in the form of calcium carbonate is further processed by the addition of ground pozzolana, a volcanic ash having siliceous and aluminous material. $CaCO_3$ (limestone) plus volcanic ash (instead of sand) eliminates the energy intensive, high-temperature process of formulating conventional cement. The heating step required for manufacturing generic cement results in a massive release of $CO_2$ into the atmosphere. By using volcanic ash, the heating step has already been completed.

The limestone/carbon dioxide slurry in combination with a clay-like volcanic ash hardens under water. Either fresh or salt water can be used for similar results.

Preferably, embodiments of carbon dioxide control devices can be a molded ceramic canister offering uniform manufacturing, operation, and recycling capabilities without departing from the spirit or scope of the present invention. Applications may include installations on the small motorized rickshaws prevalent on the streets of India, lawnmowers, chainsaws and the like. The ceramic canister, a one-time usage flow-through $CO_2$ filter is a small exhaust pipe insert that can be easily extruded or molded, hand or machine-packed, and packaged virtually anywhere. The exemplary flow-through $CO_2$ filter includes small mesh screens applied to the inside diameter. The filter also contains sealed packets of granular KOH or NaOH. As the combustion exhaust is exposed to the filter, there is "flow-by-reactant" $CO_2$ capture.

The exemplary carbon dioxide control device used to capture carbon dioxide from any vehicle combustion waste is not limited to vehicle tailpipe placement alone. The filters or flow tubes can be located on the front or sides of a vehicle, within venturi shells to capture ambient $CO_2$ as the vehicle travels. Placement of these carbon traps or filters within the vehicle design can be varied depending on a particular application without departing from the spirit or scope of the present invention. These built-in devices can consume ambient air just as effectively as engine compartment air-filtration presently supplies oxygen for combustion. Venturi $CO_2$ filters can also work with the vehicle's computer to sense and report major spectral features of different chemical aerosols if a laser spectrometer is employed and grid-mapped results uploaded for driver and even multi-vehicle awareness. Multi-vehicle reports of a particular abundance of $CO_2$ for example, or methane ($CH_4$), could send data to activate a local/regional air treatment center. These treatment centers operate as large, fan-driven systems filtering substantial amounts of $CO_2$ in a scalable version of the vehicle device described. The large filter system can be tied to existing street drainage.

Figure 4:
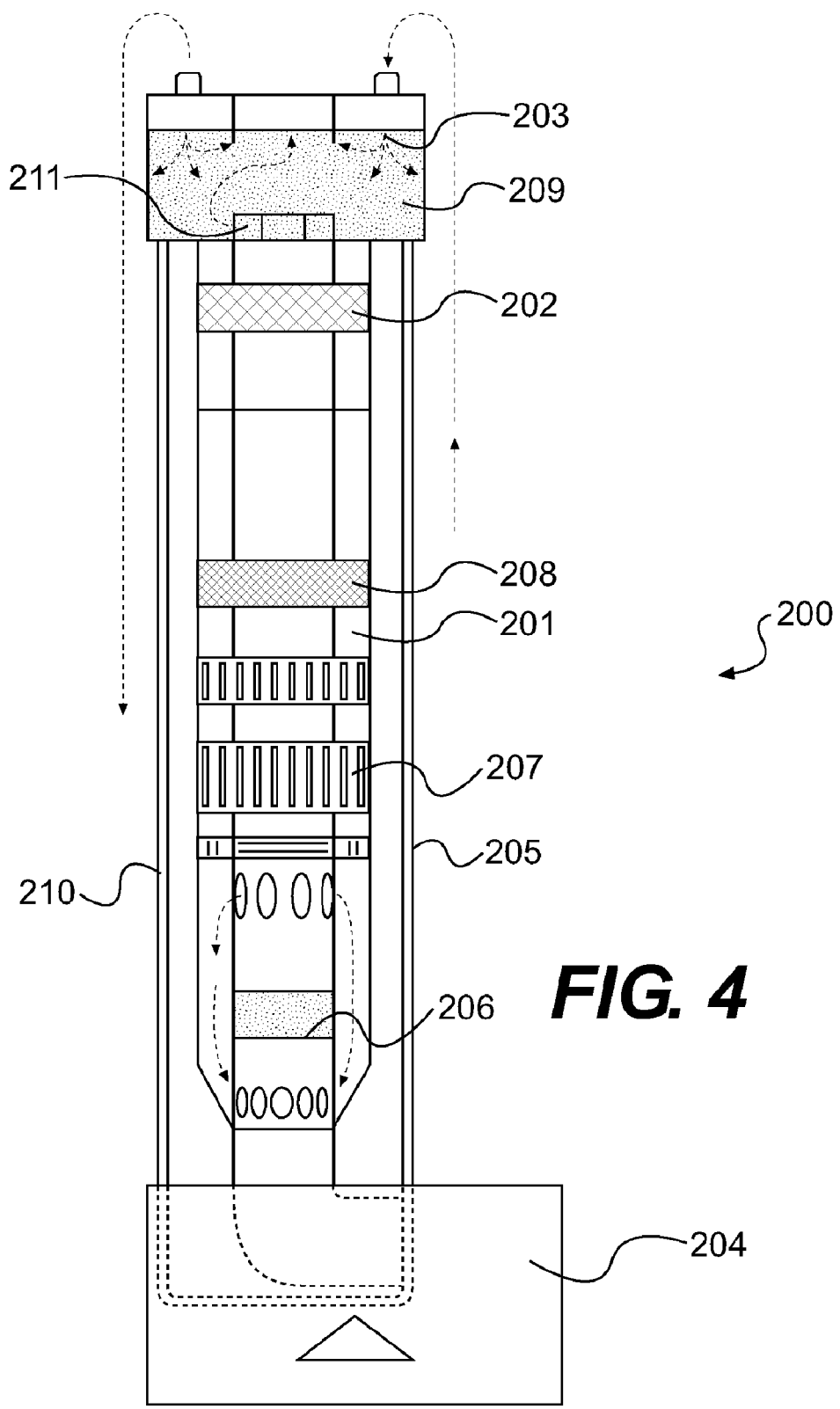
FIG. 4 is a schematic view of a structure for the treatment of industrial flue gas for CO$_2$ emission control and retention of heat.

According to another aspect to the present invention, FIG. 4, schematically depicts a structure 200 for the treatment of industrial flue gas for $CO_2$ emission control and utilization of captured $CO_2$ to form useful by products. The specific embodiment disclosed in FIG. 4 allows for $CO_2$ reduction with the ability to retain heat from wood, coal, oil and heating furnaces. In addition, the embodiment may be integrated into the design of an overall structure for the treatment of industrial flue gas for $CO_2$ extraction and use.

Figures 5, 6:
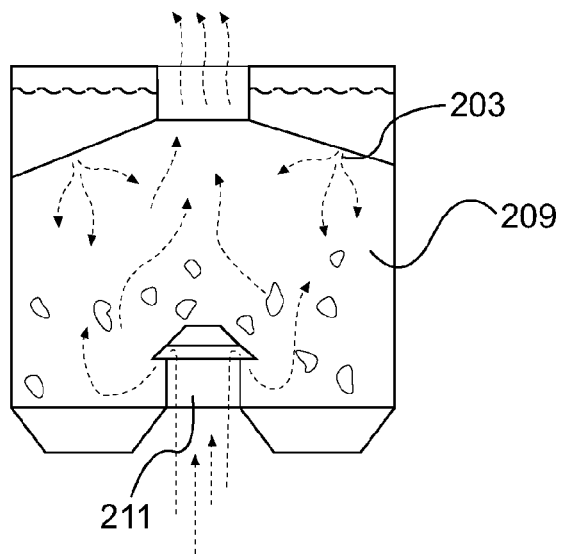
FIG. 5 is a chart of the vertical spacing of various elements depicted in FIG. 4.
FIG. 6 shows further details of the upper portion of the structure shown in FIG. 4.

FIG. 5, is a chart that depicts a preferred location of various elements spaced vertically along the elongated tubular structure depicted in FIG. 4.

Referring to FIG. 4, an elongated tubular structure 201 defines openings at the bottom and the top to accommodate the entry of air and the exit of air for a high volume flow of forced air into an through a $CO_2$ filtration chamber means. The $CO_2$ filtration chamber means is located remotely from the air entry orifices located at the bottom of the tubular structure. The filtration chamber means is located at a distance about 5 tube diameters from the air entry orifices to facilitate prevention of distortion of the velocity distribution of the stream of air within the tubular structure. The filtration chamber means includes a filter 202 having a high surface area and a shape to allow air a sufficient resident time and sufficient turbulence so that the air has a sufficient air to filter media boundary contact. The carbon dioxide in the air forced through the tubular structure is forced to flow through a continuously folded, double sided mat coated with diatomaceous earth and fresh and sea water alkaline solution soaking the mat.

Diatomite is a soft, rock containing siliceous skeletons of small aquatic plants called diatoms. These shell like diatoms each have a high surface area and together in powder form offer enough reticulated surface sufficient to attract many times their weight in water. The diatomaceous shell powder is dispersed to distribute in a coating on the layered filter mats which are either folded many times or hung in parallel as panels across the air flow path at midstream within the elongated tubular structure.

Also depicted in FIG. 4 are liquid solution spray ports 203, located on opposite sides of the elongated tubular structure 201 adjacent its upper end. The spray ports continuously provide water vapor to the convection zone 209 of FIG. 4. The convection zone is described in detail and is further depicted in FIG. 6. Water based alkaline solution treats the top column airflow and also drips down through partially capped entry port 211 (FIG. 4) the uprising airflow to the $CO_2$ filter 202 within the elongated tubular structure 201 to accumulate in a lower holding tank 204 at the bottom of the structure which serves as a source of solution. A pump (not shown) is used to move water based alkaline solution contained within the holding tank to the upper spray ports by way of vertical pipe means 205.

The holding tank 204 is designed to be partitioned with a weir. The weir separates a low Ph region of solution containing $CO_2$, from a higher pH region which is replenished and pumped to the upper ports as the two regions rebalance in the two tank system circular cycling. When the high Ph region of the solution reaches a more neutral value of about 7.75, the solution mixture is transferred into another tank (not shown) for treatment with hydrated calcium hydroxide and for further processing.

Referring specifically to FIG. 4, it depicts the elongated tubular double-walled structure 201 which defines openings for air at the bottom region as well as the top region thereby providing a flow path from the bottom region to the top region. In order of position, at the very lower input area to the elongated tubular structure is a holding tank structure 204. Immediately above the holding tank structure and associated with the tubular structure is a catalytic combustor 206 (500° Fahrenheit) Immediately above the catalytic combustor are circular flue openings 207 for a portion of the flow of unburned hydrocarbons to recirculate back through the catalytic combustor again. Above this is a baffle structure followed above by a radiative zone for a heat exchanger 217. Immediately above the heat exchanger zone is a fly ash filter 208 and situated further above the fly ash filter is the $CO_2$ filter structure 202. At the very top of the elongated tubular structure is located a zone 209 called the "convection zone". As depicted in FIG. 4, the convection zone 209 is supplied with warm dilute sodium hydroxide from the holding tank by way of pipe means 205. In addition, pipe means 210 are provided connecting the convection zone 209 to the holding tank means 204 to allow for relatively colder, dilute sodium hydroxide to return to the holding tank.

The convection zone 209 of FIG. 4 is further depicted in FIG. 6 and it has the following characteristics: remaining flue gases are allowed to circulate out of the vented flue cap 211. The gases at this point are a higher temperature than the circulating sodium hydroxide. The temperature imbalance attempts to rebalance, hence further convection. In addition, a cool mist of chemical is continuously introduced to the turmoil which serves to cool the gas further and absorb any remaining pollution elements that are thus encouraged to settle-out in the surrounding trough depression or sludge clean-out. A portion of the mist gets entrained beneath the end cap opening 211 of FIG. 6. This moisture is received by the $CO_2$ filter 202 of FIG. 4. Moisture runoff from entry port 211 and from $CO_2$ filter 202 is only allowed to collect at the base tank 204. The rest of the column is dry. Above all this and just before exiting the stack altogether, is a mist eliminator (not shown). An air sample port (not shown) for quality control checks is positioned above the mist eliminator.

What is shown in FIG. 4 is a means to clean coal, oil, wood, natural gas or biomass combustion flue gases on their way up the chimney. Also shown is a means to save some of the heat normally lost to the atmosphere. The tasks performed by the tubular structure are to accomplish the cleaning and retain heat without restricting draft up through the entire apparatus. So thermally at the bottom there is hot air movement with it being desirable that overcooling does not disturb thermophoresus all the way up. Cooling the gasses too much too soon may cause flow problems. Cooling the gases at the top portion of the device does not matter as much because of the mass downstream is in continuum.

After the inefficient burn characteristic by all fires the hot gasses begin to cool quickly but at around 500° the path forces the fluid to pass through a catalytic combustor 206. The job of a catalytic combustor is to ignite and burn some leftover hydrocarbons with the help of oxygen which is still present and abundant along with a lot of water. Also this device is a ceramic cylinder full of holes coated with micro-particles of platinum that have a high affinity for hydrogen (more oxygen) and will burn nitrates and sulfates at around 500° Fahrenheit. All the nitrogen passes through the unused oxygen at this point, which either hangs out in pairs ($O_2$) or teams up with carbon ($CO_2$). Above the combustor 206 are openings which allow gases to recirculate back through the combustor again. This acts as a slip-stream for the unburned portions of gas. Not shown here is ducting 214 depicted schematically in FIG. 7, which improves the action greatly.

The next zone is filled in a circular manner with heat retention cells 207. The material used can be anhydrous crystalline solids sodium sulfate ($Na_2SO_4$) and Borax $Na_2B_4O_7$ with the addition of de-ionized water which form five-sided crystals that transition to six-sided crystals at about 500° Fahrenheit. These are sealed into cells to capture heat and retain waste heat to do low energy work. Also useful for this purpose is base magnesium silicate or talc of the metamorphic mica group which is sliced into cubic rectangles circling the recess around the flow to retain heat otherwise lost to the atmosphere.

Further up is a fly ash filter 208 which can be a large ring of ceramic insulator material isolated from ground, and studded with (number to vary with diameter) protruding tungsten points charged several thousand volts AC with very little amperage. This creates a strong electric field that alternates at 60 hertz between positive and negative and placed far enough up the stack to be away from the more powerful influence of heat. Large and small particles of unburned debris, fly ash, and molecular conglomerates all pass through this electric field and become charged or neutralized depending on the material. The next experience for the particles is collector plates—one positive and one negative. Debris collects in this region. Both the plates and the points collect ash material and eventually will arc if not cleaned periodically. Some fly ash, depending on the fuel, is water soluble which make cleaning quick and easy by a simple shut down and spray. This part of the stack has a double or triple cylinder revolver to make cleaning easier. The $CO_2$ filter 202 is next and described in FIG. 10 with materials A through D, depicted in sequence from the top are: (A) base treated ceramic (B) diatomataous (silicon or calcium) earth with chalk (C) magnesium silicate chunks or phlogopite, another mica group mineral, and (D) stainless steel mesh.

Figure 7:
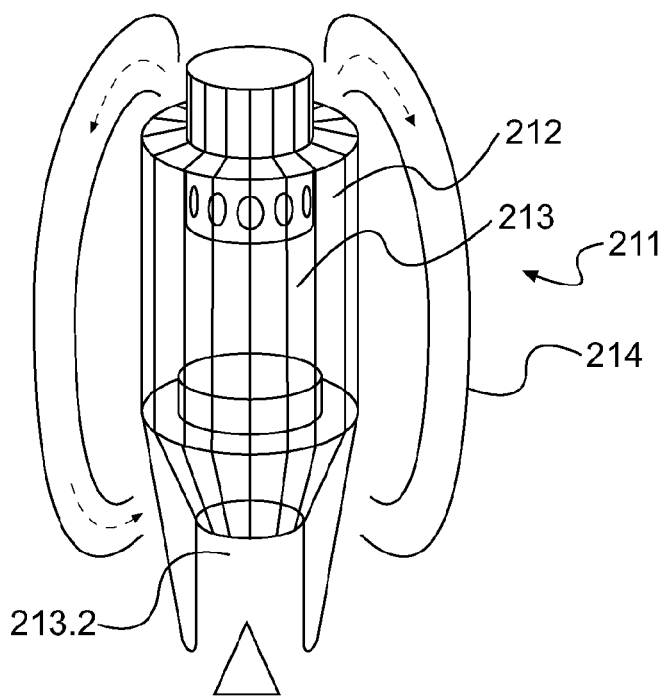
FIG. 7 is a schematic view of a catalytic combustor with CO$_2$ filtering and heat storage capabilities.

FIG. 7 is a schematic depiction of a catalytic combustor heat zone 211 designed to operate at 500° F. and allow a portion of exhaust with CO2 recirculation with other flue gasses back though the combustor 206 again. In particular, FIG. 7 depicts vertical spacing for heat retention inserts 212. The material used can be anhydrous crystalline solids of sodium sulfate (Na2SO4) with Borax (Na2B4O7) mix with pure de-ionized water which forms a five-sided crystal at room temperature, the transitions to a six-sided crystal at about 500 degrees F. These are sealed into cells to capture heat and retain heat to do low energy work. Also useful in this application is base magnesium sulfate or talc of the metamorphic mica group which is sliced into cubic rectangles to circle the recess 211 around the flow opening 213 above the catalytic combustor 213.2. Accordingly, as flue gas formed from combustion flows upwardly through the catalytic combustor, the flow encounters a perforated baffle region where a portion of the flow re-circulates back though two slip stream returns 214. These jug handle returns 214 serve two important functions 1) breaking boundary layers, and 2) enhance the efficiency of the combustion process.

Figure 8:
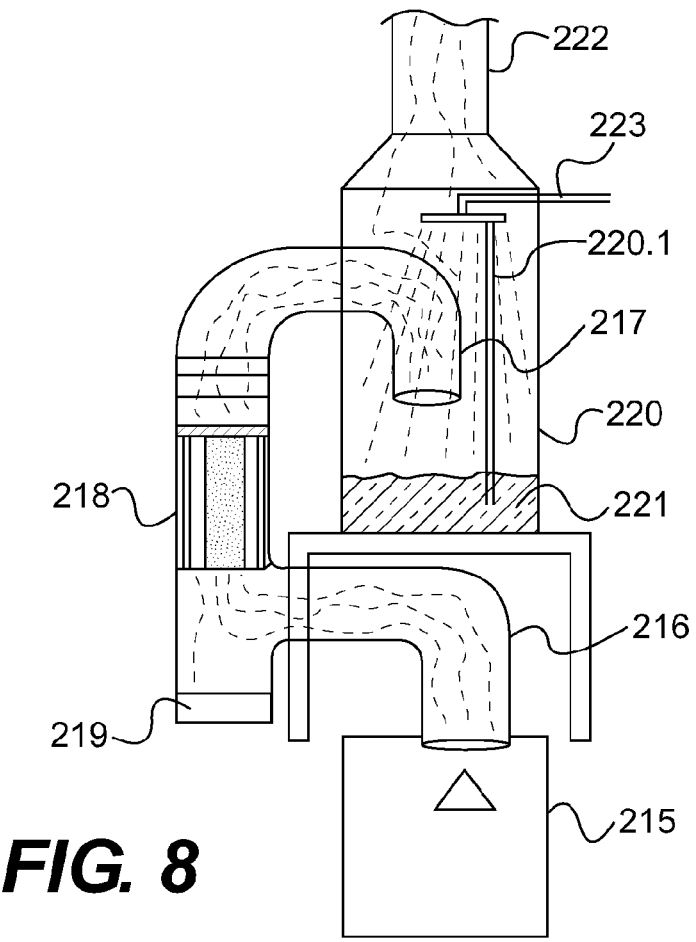
FIG. 8 is a schematic view of a structure for capturing CO$_2$ from the exhaust of a heat source.

FIG. 8 is a schematic drawing showing one embodiment of an arrangement of structures to provide a $CO_2$ control device for capturing $CO_2$ from the exhaust from a heat source. Starting at the lower portion of schematic FIG. 8, a burner device 215 is schematically depicted for burning wood coal or oil and creating flue gas containing $CO_2$. Situated above the burner is a first flue portion 216 that extends upwardly then radially outward, then upwardly once again and finally radially inwardly to form a second flue portion 217. Located in the second upward section of the flue is a filter 218. Located in the lowermost portion of the vertical flue is a soot dump location 219 which permits removal of accumulated soot and doubles as an end cap. The end cap 219 is removable for clean-out and filter change. Situated above the burner is a flue treatment container 220 which is designed to hold liquid 221 in its lowermost portion. Further, at the top of the treatment container is a stack 222 for allowing the final exhaust to exit.

As also depicted schematically is a source 223 of treatment liquid which is a water base solution that sprays treatment liquid 221 introduced into the upper portion of the treatment container wherein the warm treatment liquid is sprayed downwardly toward the liquid collection portion of the treatment container. The treatment source 223 is a base-treated reservoir which warms the liquid before sending the treatment liquid 221 to the treatment container 220. As the treatment liquid 221 is sprayed downwardly inside treatment container 220, flue exhaust containing $CO_2$ with other contaminated waste is oriented by flue portion 217 to flow downwardly into the interior of the treatment container and then upwardly in a direction counter to the treatment liquid spray direction. This arrangement enables time for the flue exhaust containing $CO_2$ with contaminates to react with the treatment liquid to remove $CO_2$ from the flue flow and to create a more acidic solution in the lower portion of the treatment container containing contaminated liquid $CO_2$ byproducts and particulates in and out of solution form which is, in turn, taken off from the lower portion of the treatment container for further processing to form a useful material.

Treatment container 220 contains at stem-like structure 223 extending from the spray nozzle into the liquid collection 221. Structure 223 is a electronic sensor with sensing probes top and bottom that measures parameter differentials between incoming liquid 223 and collecting liquid 221. The flue gas at this point needs to be monitored to ensure the flow by reaction portions of the apparatus are functioning correctly and the flue gas does not cool beyond a range of operating temperatures. The measurements monitor differences in pH, temperature, viscosity, flow rate, and dissolved oxygen.

The filter portion of the flue is a segmented flow-through device 218 partially shown. Each one of the eight segments is spaced evenly apart to extend outwardly from the center of the pipe to the circumference of the pipe inside the upward portion of 216. Each radius is a packet of material which reacts with moisture in the flue gas. The segmented packets contain a thin portion of evenly distributed diatoms and crystals of KOH inside a woven hydrophilic ceramic wool with activated carbon partition strips sewn throughout the packets. The device 218 serves to collect $CO_2$ and moisture by use of capillary forces by being positioned in a cooler portion of the flue pipe. These devices 218 wick moisture out of the gases much like a teabag effect, absorbing moisture along with $CO_2$ in this case.

The treatment container liquid and contents 221 are removed by means of a valve (not shown), to be contained for further processing as the eventual condition of the liquid collection becomes acidic. The $CO_2$ loaded liquid is distributed for chemical treatment, sludge recovery, aggregate addition, and heat treatment—operations by mechanical means to convey and process products with minimum human intervention beyond computer monitoring or remote adjustment made via software driven auto-logic actuators. Precautionary sensors and leak detectors continuously monitor and prevent $CO_2$ venting at any step.

Figures 9, 10:
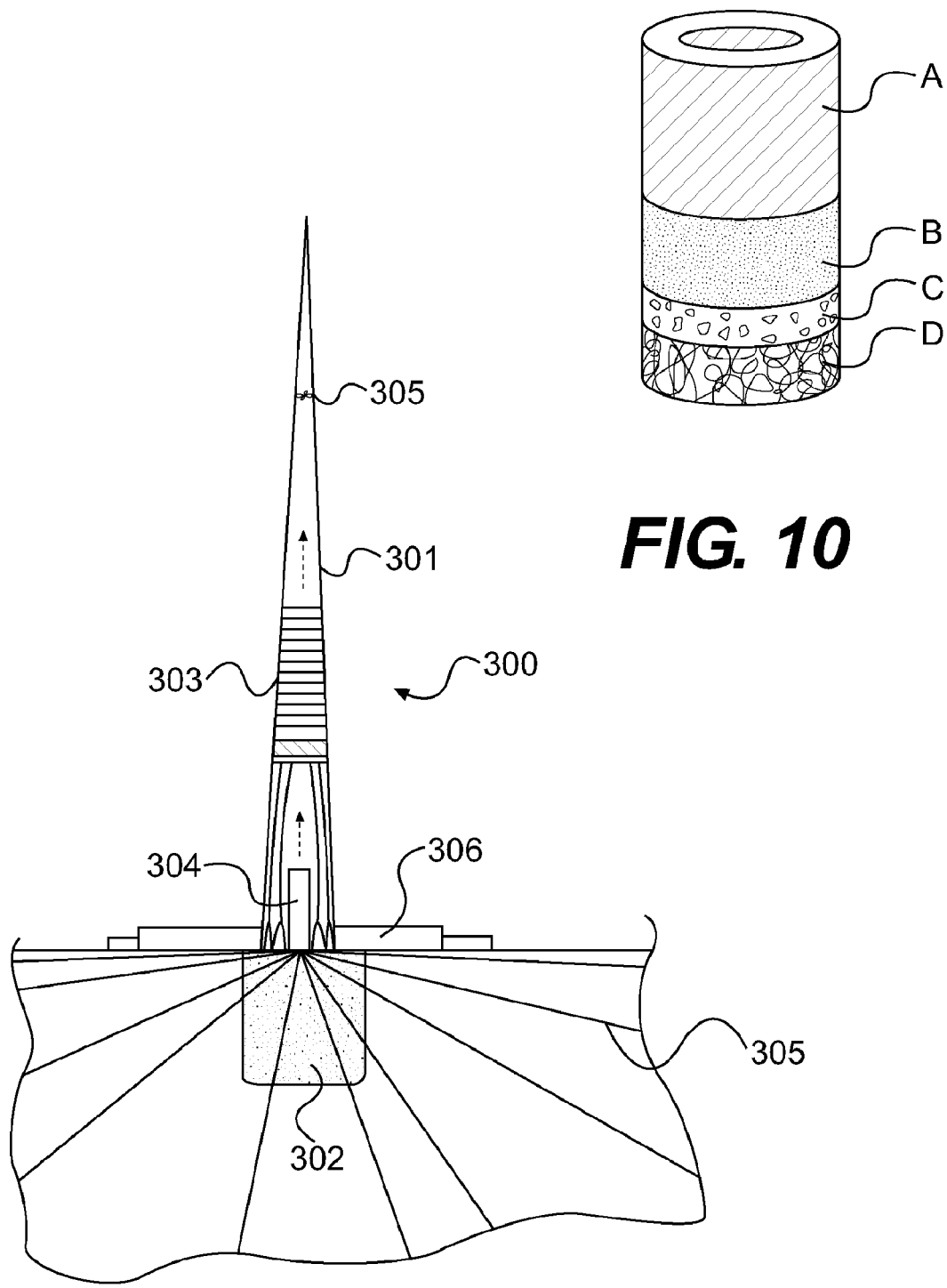
FIG. 9 is a schematic view of a structure for trapping CO$_2$ from atmospheric air in remote locations.
FIG. 10 is an enlarged view of a CO$_2$ filter used in a filter bank in the structure of FIG. 9.

According to another aspect of the present invention, FIG. 9 schematically depicts an apparatus 300 for trapping $CO_2$ from atmospheric air whereby $CO_2$ is reclaimed continuously in remote locations such as hot, sun-baked regions of the world.

The structure of FIG. 9 includes a vertically oriented conical structure 301 mounted on a base 302 in operation; atmospheric air enters through openings at the base of the conical structure and flows upward through the $CO_2$ absorption elements 303 and further upward to escape into the atmosphere. Energy to create a temperature gradient whereby the lower end of the cone is heated and the upper end of the cone is relatively cooler is generated by an element forming a heat core 304 situated within the bottom of the hollow cone like structure. The heat core is heated by well water treated alkaline absorbers 305 ducted atop sun reflectors that extend outwardly into the hot sun-baked region in a radial formation surrounding the conical structure. In operation, unfiltered atmospheric air enters through the air entryways at the bottom of the cone by induced low pressure gradients.

The incoming air experiences an upwardly aimed regulated jet of steam that drenches the air by a continuous pressure-induced upward spray of hot diluted sodium or potassium hydroxide super-heated by light concentrators extending outward into the desert.

Figure 16:
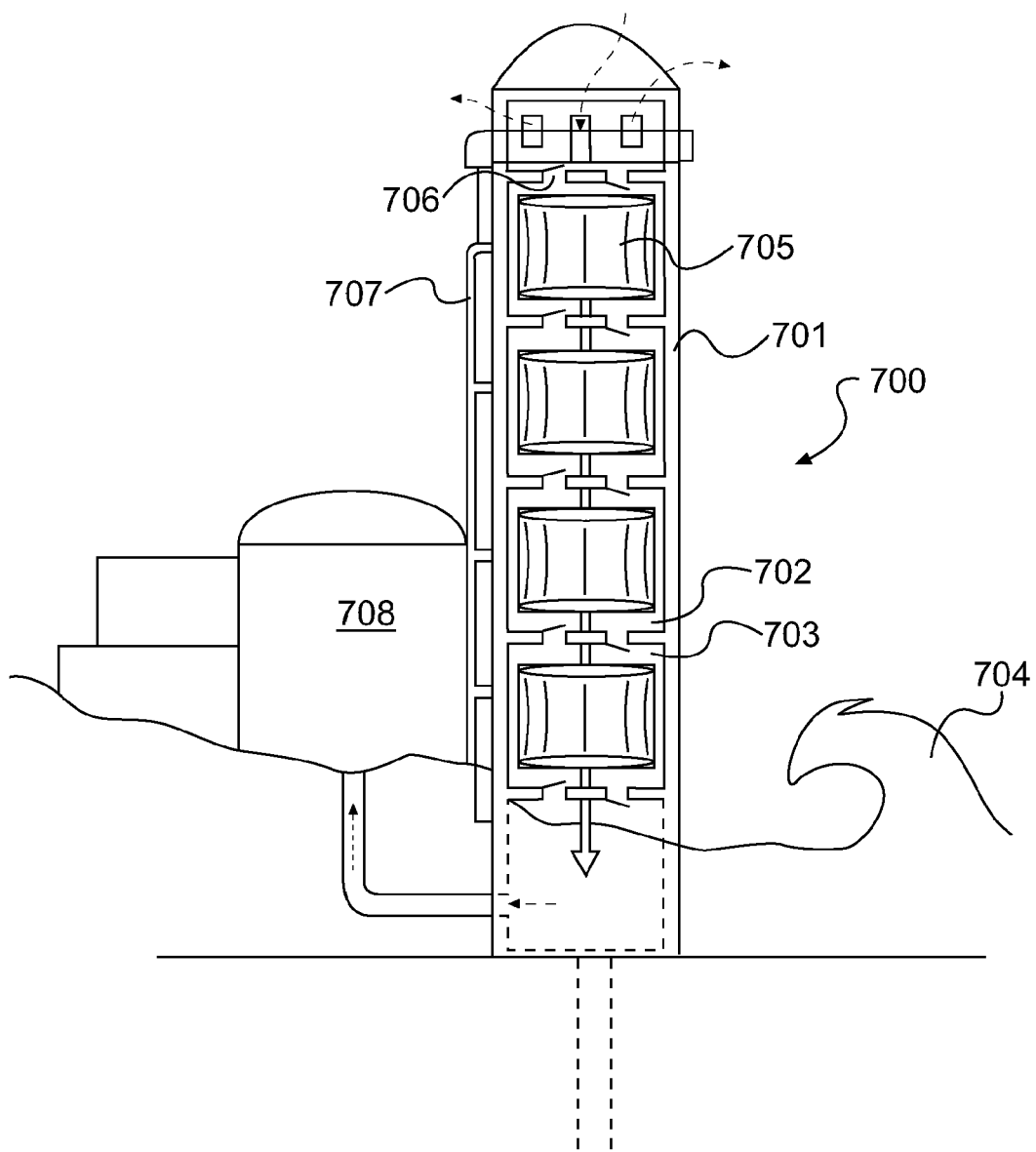
FIG. 16 is a schematic view of a structure for capture of atmospheric CO$_2$ using water wave energy to generate air flow.

Above the spray zone the air flows upwardly under convention forces caused by the flow of heated air to cooler regions. In addition, FIG. 16 depicts schematically a bank of flow through filtration units located in the double-walled, cool, and condensing region of the tower. As the moisture-laden air contacts the cooler filter center, condensation occurs, the alkaline filters absorb the air's moisture and $CO_2$ content. The filter bank portion of the tower is located within the double walled sections to allow moisture fall-back to drain down ducting captured carbon to below ground reservoirs. This treated water system may exist separate from the heated water system which is replenished by well-water which feeds to the desert array. The two closed loops can be independent of each other, as suggested, or not, but $CO_2$ evaporation should be avoided.

As described above, the eventual acidic condition of the $CO_2$ loaded liquid requires change-out periodically. If the acidic solution is to be processed on site to make limestone products, the acidic tanks are drained and replenished with treated well water. The saturated water is distributed via pipeline or closed conduit to auxiliary separation tanks for chemical treatment, sludge recovery, aggregate addition and heat treatment.

Operations require mechanical means (not shown) to convey and process products with minimum human intervention beyond computer monitoring or remote adjustment made via software driven auto-logic actuators. A precautionary process of sensors detects and prevents $CO_2$ venting at any step in production. Machine vision and remote control is recommended, with communication linkages via satellite to deliver information in regards to operating parameters, product testing, incoming/outgoing air quality accompanied by air pressure and temperature checks.

A turbine 305 is located in the upper region of the conical housing whereby the turbine can drive an electrical generator to generate electricity from the flow of air past the turbine. Steam turbines and solar PV units (not shown) are sited at the base structures 306 as well.

As depicted schematically in FIG. 9, the apparatus can be provided with a processing center which functions to collect the $CO_2$ absorbed by the filter bank (one segment shown) and allows $CO_2$ filtrate to be converted into useful end products such as mortar, cement, plaster, brick, block, slurry and tile. FIG. 10 is an enlarged view of one element in the $CO_2$ filter bank depicted in FIG. 9. In FIG. 10 the materials depicted in sequence from the bottom to the top are: (D) stainless steel mesh, (C) base magnesium silicate ($Mg_3Si_4O_{10}(OH)_2$) chunks, another mica group mineral, metamorphosed limestone and dolmites, is chunks of phlogopite ($KMg_3(AlSi_3O_{10})(OH)_2$ is also recommended and is used in FIG. 5. FIG. 14 and FIG. 5 would be the same components if the extra Mg and K supplied by phlogopite were used (B) diatomataous (silicon or calcium) earth with chalk, and (A) base-treated ceramic wool.

Figure 11:
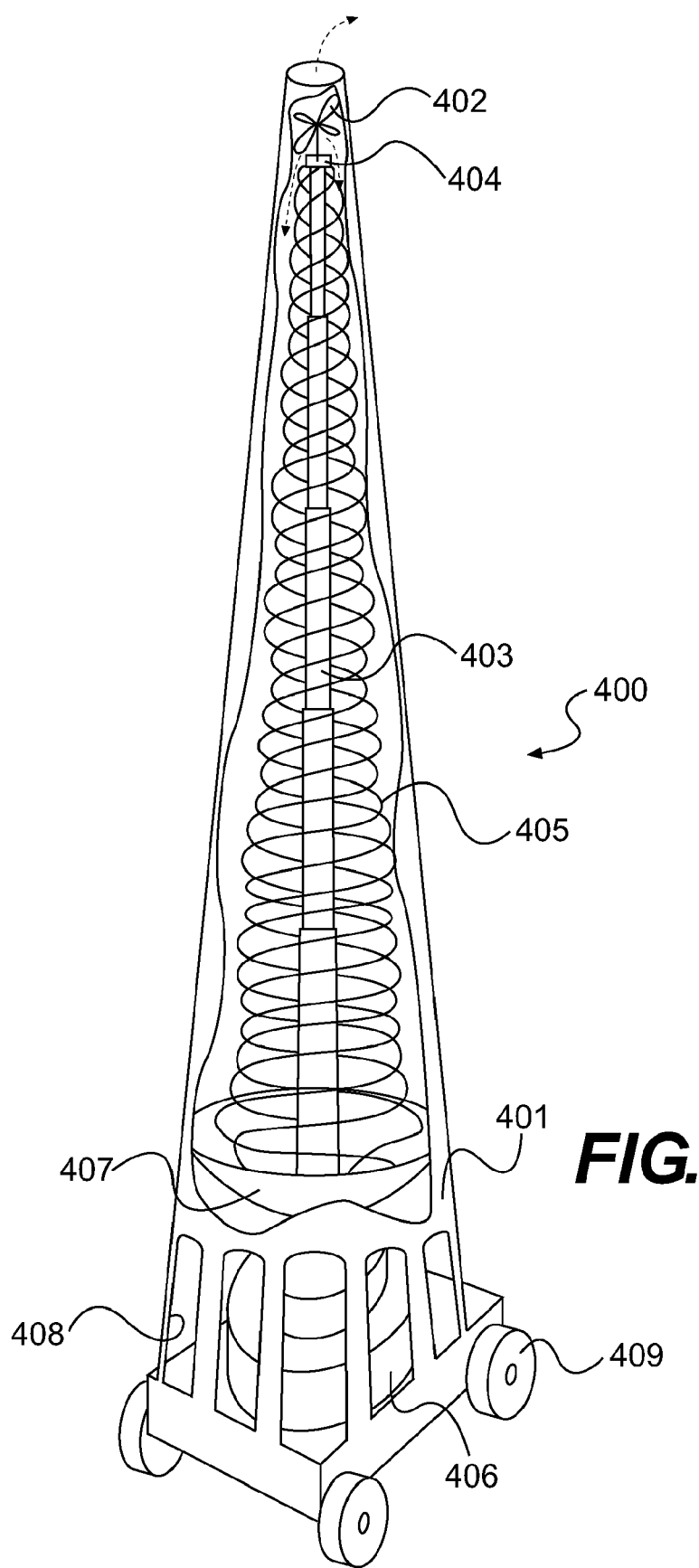
FIG. 11 is a partially cut-out view of a structure for trapping CO$_2$ from atmospheric air.

According to another aspect of the present invention, FIG. 11 depicts another embodiment having a conical structure 400. In FIG. 11, a black carbon fiber conical housing structure 401 collects radiant energy from the sun. In addition, heat is collected by the black housing structure at the base of the truncated cone. As depicted in FIG. 11, an air driven fan 402 in the upper end of the conical housing is provided to turn an electrical generator to generate electrical energy for operating other portions of the apparatus such as liquid pumps. In addition, in the embodiment depicted in FIG. 11, there is a vertically oriented extendable pipe 403 with a spray nozzle 404 formed at its upper end adjacent the upper end of the conical housing to release treatment chemicals.

Also located in the region from the lower portion of the conical housing 401 to the upper portion just below the spray nozzle structure 404 is any conventional structure 405 to provide a reticulated surface area for the interaction of atmospheric air with the treatment chemical sprayed at the top of the cone and thereby flowing downward through and over the reticulated surface area. In addition, located within the conical housing and adjacent the lower portion of the vertical pipe 403 for the chemical treatment liquid, is a tank structure 406 which serves to warm the chemical treatment solution because it is located on the black housing structure at the base of the depicted unit. Also, as depicted in FIG. 11 is a drip pan structure 407 at the base of the reticulated surface area structure to capture and recirculate any chemical treatment liquid.

As seen in FIG. 11, the carbon fiber housing structure 401 with air openings 408 with its extendable center pipe 403 will collapse for travel may be provided with wheels 409 or other means to allow travel of the unit from one location to another for $CO_2$ capture from atmospheric air.

Figure 12:
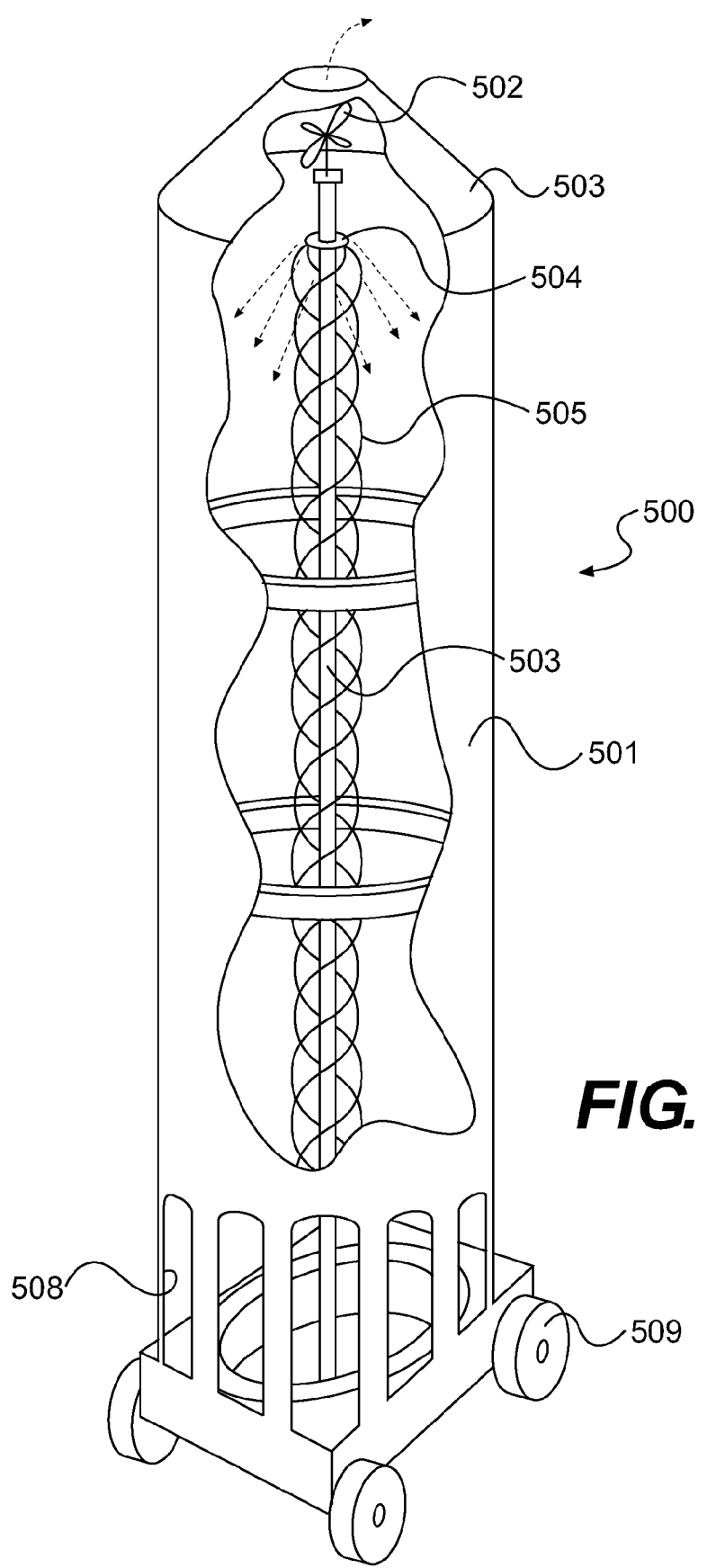
FIG. 12 is a partially cut-out view of a structure for trapping CO$_2$ from atmospheric air.

FIG. 12 depicts still another embodiment of a device 500 similar to FIG. 11 with the exception that the housing 501 is generally cylindrical with air openings 508 at its base and the upper end 503 of the cylindrical housing has a truncated conical form as depicted. Otherwise, the internal mechanisms are similar to that described above with regard to FIG. 11 (and hence the same reference numbers are used but increased by 100) except, it should be understood that the housing structure 501 can be made of a carbon fiber material but in this case not remotely located. Thus, the FIG. 12 embodiment is an air treatment device for smog and mega city traffic pollution. This device 500 can be mobile and moved from one location to another, or used as a stationary curb-side unit having connective capabilities to existing storm runoff drains which lead to water treatment centers. However, those passageways in this case are fitted with smog-pipes which lead to air treatment centers to be located adjacent to the storm water or sewage treatment centers.

The embodiment of FIG. 12 may treat ozone, smog particulates, waste hydrocarbons, nitrogen oxides, sulfur oxides, carbon monoxide, as well as methane and carbon dioxide. FIG. 12 effectively charcoal filters, smog washes, and $CO_2$ filters street air if a plurality these are used. The units may require frequent maintenance to replenish filters and fluid. Otherwise, if connected to existing infrastructure, less attendance is needed. This embodiment is a stand alone air cleaner best situated for high pollution areas such as cities where air quality controls are not yet in place. Often the above locations are in developing countries where relatively inexpensive controls such as the embodiment of FIG. 12 are needed and can provide additional income in the form of carbon credits. It is conservatively estimated that 100 units operating together on the streets of Shanghai, Bombay, or Mexico City could easily capture 100 tons of carbon every 3 days. World wide, the price of one ton of carbon is currently around $14 to $25, but is expected to increase.

With reference to the embodiment shown in FIG. 13 of the drawings, this depicts a segmented wind tower 600 with solar power. The overall apparatus is used for $CO_2$ capture and includes a water and chemical tank, drop generators, a remote long term collector reservoir holds water and chemical to last long time periods. The tower of FIG. 13 includes a vertical structure 601 formed of a plurality of stacked discs formed of alternating filter sections 602 and drop generators 603 as depicted in more detail in FIGS. 14 and 15 respectively. The device utilizes solar panels 604 to generate electricity which can be stored or used directly to drive a fan 605 located in the upper portion of the tower to assist the flow of air containing $CO_2$ to be segregated at the lower portion of the tower and to flow upwardly through the filter sections 602 which are supplied with appropriate chemical solutions from the drop generators 603. The flow path for air is designated as 606 in one side. The structure of the tower is six-sided so, 606 is only one of six airflow columns. As described further above, at the lower portion of the tower is a tank 601 for holding chemicals and water for processing the $CO_2$ laden solution generated by the filter sections. Further processing of such solution can be done in process stages as depicted schematically as P1-P4, etc.

FIG. 15 depicts a drop generator 603 having a PZT driver 607. FIG. 15 depicts only one of many hundreds of drop generators 603 positioned around the interior of the tower and recessed between each filter section 602 (FIG. 14). Sensitive to movement, the piezoelectric quartz crystal of the generator 603 provides periodic droplets of purified water out of the vibrating orifice 608.

In FIG. 15, reservoir 609 holds a one milliliter sample. Ignoring evaporative losses, a one milliliter sample would produce small (half micron) droplets, one per second for thousands of years. This implies that the tower 600, containing hundreds of filters and drop generators is sufficient; no plumbing required.

According to another aspect of the present invention, FIG. 16 illustrates a water and air column structure 700 for atmospheric $CO_2$ capture using wave energy. In FIG. 16, the depicted structure includes a housing 701 defining a plurality of chamber means 702 located one above another. Each chamber means 702 has a one way valve means 703 to control one way air flow in the upward direction. The bottom chamber means 702 defines an opening positioned to receive waves of water 704 at both high and low tides. When a wave of water 704 enters through the opening into the bottom chamber means 702, the water volume displaces all or most of the air in the bottom chamber means 702 through the one way valve means 703 to the chamber means 702 immediately above the bottom chamber means 702. The superimposed chamber means 702, in turn, expels its contained air through another one way valve means 703 for controlling one way vertical flow of air to a third chamber means 702 situated above the second chamber means 702. The air forced upwardly through the housing 701 is sequentially filtered by $CO_2$ absorbing filters 705 in the upward flow path and the filtered air finally exits the structure from the top.

The top of the housing 701 defines an opening to allow atmospheric ambient air into the top chamber means 702 through another one way valve means 706 to control one way downward flow of air. These one way valve means 706 to control downward flow of air allow air to flow to replenish to each chamber means 702 below the top of the structure. So each chamber means 702 as depicted has a one way valve means 703 to control one way flow of air in a vertical upward direction and another one way valve means 706 to control the one way flow of air in the downward direction. As depicted, as each wave of water 704 enters the bottom chamber means 702, the one way valve means 703 to control air flow in the upward direction opens and allows upward flow and to sequentially activate the upward flow valve means 703 to equalize the pressure differential. When upward flowing air exits the structure 700, the one way valve means 706 to control air flow in the downward direction opens to equalize pressure in the structure 700. The $CO_2$ absorbing filter 705 absorbs $CO_2$ in each chamber 702 as atmospheric air cycles through the disclosed structure 700. Each $CO_2$ control chamber 702 for capturing $CO_2$ from air comprises a flow through apparatus and a $CO_2$ absorbing filter 705 treated with an alkaline material and housed within the flow through tower apparatus 700.

The structure 700 from top to bottom may be tapered having the bottom diameter larger by one half over the top diameter. The structure is reinforced with thick walls much like modern lighthouses, is tightly insulated, and is built to dimensions intended to withstand sturdy weather, rogue waves and to continue to function for long time periods.

The flow through tower 700 receives air for treatment flowing in both the upward and downward directions within the housing 701. As the fluid flows in the upward direction. each chamber 702 is limited in size to dampen effects brought about by increasing boundary layer thicknesses, vortices, and turbulence.

However, before air upward velocity is reduced, air-ion mixing is introduced to each turbulent region of each chamber 702 beginning with the second chamber 702 from the bottom and continuing upward through the one way valve 703 series. An abundance of alkaline-treated sea water spray is supplied by nozzle flow from pipe system 707 with sufficient ions to drench the air already undergoing changes in speed, magnitude and direction. The turbulent flow advantage is to increase the influence of mixing already characterized by recirculation eddies and apparent swirling randomness.

When a compressible flow enters a confined region like the chamber 702 described, the boundary layers immediately grow on the walls of the chamber. (See Britannica.com.turbulentflow). The fluid dynamics of the boundary layers quickly thicken upwards above each one way valve 703. The effects of boundary layers are largely avoided by use of spray and sequential valves.

The air entering the chamber through a valve is immediately more laminar upon entry at the floor level and then quickly becomes more turbulent further up. The spray nozzles are positioned to entrain the $CO_2$ laden air into the ion-sea water spray. The upward flowing rush of air with its $CO_2$ content experiences an ion exchange due to the nozzle induced alkaline-charged spray and carbon is absorbed while the upper valve 703 door opens to the chamber 702 above. The process repeats. The falling spray water with its captured carbon is further filtered upon exiting each chamber though floor drains. The drains connect to drain conduits which lead to below ground catchment basins or holding tanks where the alkaline sea water collects to re-circulate upwards again by pump action.

The ions of choice include alkaline metals, lithium, sodium or potassium which are highly reactive and easily give up their lone, outer shell, s-electron. Others recommended are magnesium or calcium which are more moderately reactive alkaline earth metals.

The underground holding tanks (not shown) serve an additional purpose of geothermal reservoir for interior radiant temperature regulation. Pump power is provided by wave generators, wind turbines, and solar photo voltaic (PV) mechanisms (not shown). The tower and auxiliary units may be designed to operate by direct current energy storage as well as alternating current (AC) availability.

The windows of the structure 700 may be fitted with Fresnel lenses which focus either direct or diffused sunlight onto interior collectors for heating and cooling purposes.

Wave powered atmospheric $CO_2$ capture is effectively temperature-dependant because the gas solubility decreases as the temperature of the water increases. Ideally, both warm and cold water locations need temperature regulators in towers to optimize the function of a carbon sink in a more controlled manner. However, actual hot or cold conditional differences in $CO_2$ absorption are not that significant—capture will diminish but not entirely. Furthermore, for most substances, hot to cool is an easy transition thermodynamically.

Tower placement sites are not confined to marine shores only. Large fresh water lakes are suggested for additional wave-induced air capture and $CO_2$ harvesting systems.

Over time, the remote tower with auxiliary equipment is meant to auto-operate with only periodic maintenance provided as needed. Communication linkages via satellite deliver information about operating parameters; incoming/outgoing air quality accompanied by air pressure and temperature checks.

FIG. 16 also depicts in a schematic form the use of auxiliary devices 708 to utilize sea water with appropriate chemicals to distribute sea water and the chemicals through pipelines or conduits 707 to the stacked chambers-in-series 702.

Over time, the below ground contents of the holding tanks may saturate with dissolved $CO_2$ and the water becomes acidic. If the acidic solution is drained though porous limestone, the calcium carbonate converts to soluble calcium bicarbonate, a useful product:

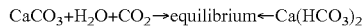

$$CaCO_3+H_2O+CO_2 \rightarrow \text{equilibrium} \leftarrow Ca(HCO_3)_2$$

If the acidic solution is to be processed on site to make other limestone products, the holding tanks are drained and replenished. The saturated water is distributed via pipeline or closed conduit to separation tanks for chemical treatment, sludge recovery, aggregate addition and heat treatment. These operations require mechanical conveyors and precautionary processes that do not allow $CO_2$ venting at any step. Machine vision and remote control is recommended to a large extent minimizing human intervention.

Finished products depend on various aggregate and moisture content requirements. For example bricks of a new material are mixed with exceptional clays and with volcanic ash of a particular origin. Slurry can be piped to nearby tankers.

Absorption filters are rinsed and replenished by sea water treated alkaline material. Furthermore, the absorbed $CO_2$ collected in each filter 705 may be utilized in a further process wherein the absorbed $CO_2$ in the $CO_2$ absorbing filter is converted into $CACO_3$ and the $CACO_3$ is also combined with a volcanic ash for use as cement like end product.

Figure 17:
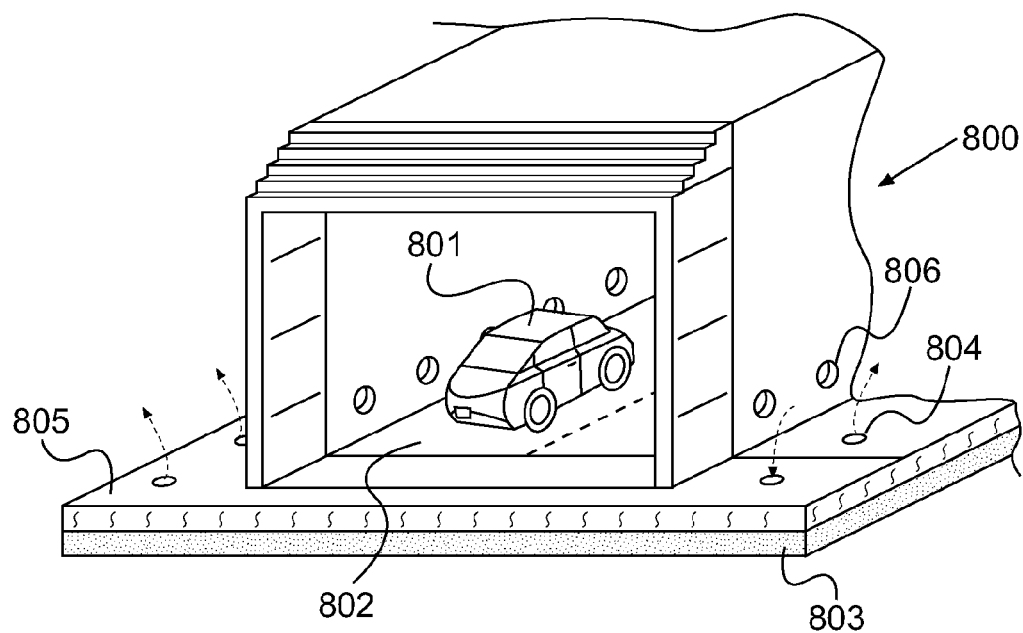
FIG. 17 is a schematic view of a structure that uses the weight of a vehicle to assist air flow during CO$_2$ capture.

FIG. 17 of the drawings depicts a structure 800 whereby the weight of a vehicle 801 on a roadway surface 802 causes a compressible material 803 to compress and then decompress after the vehicle has passed over the structure. The movement caused by the weighting and un-weighting of the structure acts as a way to force $CO_2$ laden air by way of openings 804 into and through a zone where the $CO_2$ is essentially filtered from the atmospheric air and the air lowered in $CO_2$ content is then released to the atmospheric air by way of activated carbon filters at opening 804. The compressible material 803 may include a moist and compressible mix of diatomaceous earth with sodium hydroxide or KOH. Segmented pockets of air and moisture are layered above 803. This serves vehicle stability traveling over the modified road structure 805. The walls of the tunnel structure have perforations 806 and contain air ducts leading to a fan functioning to draw tunnel traffic exhaust out of the tunnel interior regions.

This polluted air is treated to remove all combustion contaminates by use of water and chemical treatments, charcoal filtration is used to trap hydrocarbons and heavy metals. Clean, filtered air is constantly replenished proportionally volume-wise to the amounts removed. Contamination control (CC) spectral sensors and particle counters monitor air quality incoming and outgoing as a function of traffic and filter integrity. Data is monitored by computers at a central location. Existing tunnel technologies provide a relatively easy opportunity to collect carbon by simple retrofits suggested here.

Polluted air from traffic, as well as the ambient becomes removed, cleaned and replaced. One benefit is human health improvement. Commuters contributing to and breathing in tunnel air are generally known to cause detrimental respiratory conditions and heart attacks. Tunnel air concentrates air pollution as much as 1000 times higher over urban ambient conditions (3). www.sciencedaily.com *Atmospheric Environment*. Thus; FIG. 17 depicts an alternate way to perform an air flow induced mechanism for CC speed bumps, CC guard rails, CC road wickets and drive-thru smog eliminators (not shown). The weighting and underweighting method may be carried further by having the compressible material 803 built-in to exercise shoes, and made available to willing participants to jump in unison.

Additionally, for highway tunnels (not shown), suggested are, vehicle air pollution control filters with ducting intervals in exchange of sufficient volumes of contaminated air out while replenishing with clean air in. The recirculation of tunnel air method includes cleaning processes for captured contaminate removal of all combustion gases, particulates and $CO_2$.

Figure 18:
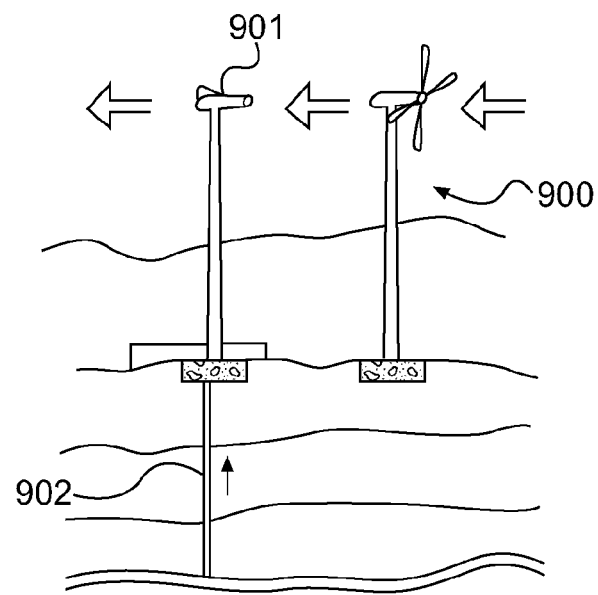
FIG. 18 is a schematic view of the use of a structure for CO$_2$ capture in combination with a wind turbine structure.

As depicted in FIG. 18, wind turbines 900 exist on required locations having consistently high wind speeds. FIG. 18 illustrates a piggyback concept using structure 901 that takes advantage of this predetermined wind power density. Thus, structure 901 may house a device using a $CO_2$ filter and other associated devices according to the active description. The carbon collector in this case employs a race car spoiler (not shown), carefully designed and oriented; this aerodynamic structure is located inside the tower cross-section and produces tremendous downward lift forces pushing compressible fluid via pipeline 902 to deliver water up the tower from a compression chamber (not shown). The compressible air chamber (not shown) may be a simple compressible air bladder forcing water out of the occupied area and up one pipe while resupply return air is supplied by another pipe (not shown). Additionally, a well water based pumping system is used as a modified in reverse ram pump (not shown) with the larger diameter drive pipe operated by compression force and the smaller diameter water return pipe is thereby enabled to be twice as long as the drive pipe.

The FIG. 18 method can be further expanded by using the downward lift forces in the higher energy density medium of seawater for the purpose of $CO_2$ consumption by algae which in turn resupply oxygen to the atmosphere. This $CO_2$ sink is accomplished by photo zone nutrient depleted regions in the southern seas where the needed nutrients have escaped the carbon cycle and remain locked in sediments of the ocean floor. A wind derived compressor 901 such as the one described above, sited with reasonable seafloor access where wind predetermined power density is sufficient to drive the reversed ram pump and therefore recirculation of sediments to promote new sinks for $CO_2$ naturally, for example, by phytoplankton blooms in the desert regions of polar oceans (not shown).

Geological formations, natural and man-made canyons, mountain passes, highway cuts though hills, are a few useful carbon capture locations (not shown). Many sites within the canyons of New York City for example channel and compress airflow effectively to create enough energy to be filtered freely by various capture filtration methods mentioned in the forgoing. Others include shoreline cliffs of uninhabited places like stretches of Greenland and South America—ideal sites for woven and draped collectors-in-containers where ambient air with $CO_2$ goes in and clean air comes out (not shown) as well as some wind-swept areas of the Great Wall of China. China's vast high plains in the western province are known for fierce winds—winds that in one case had enough concentrated energy to topple over and entire train.

In addition, banners used for marketing, event notices, and often trailing airplanes, or spanning buildings can also easily double as carbon collectors with a simple modifications (not shown). These items mention instead of being a single sheet of material could be doubled as an envelope is or triple-sided with structures of material sandwich-like activated carbon separated by woven absorption material and $CO_2$ capture material and waterproofed where needed for moisture containment. These displays do not lose their primary function, they just double as useful in variance in a environmental friendly way. Display collectors to later process for treatment including benign chemical rinsing before reuse and after displays (not shown), are one suggestion. There are many other examples for simple carbon collectors usefully attached to objects exposed to the wind and rain.

Figure 19:
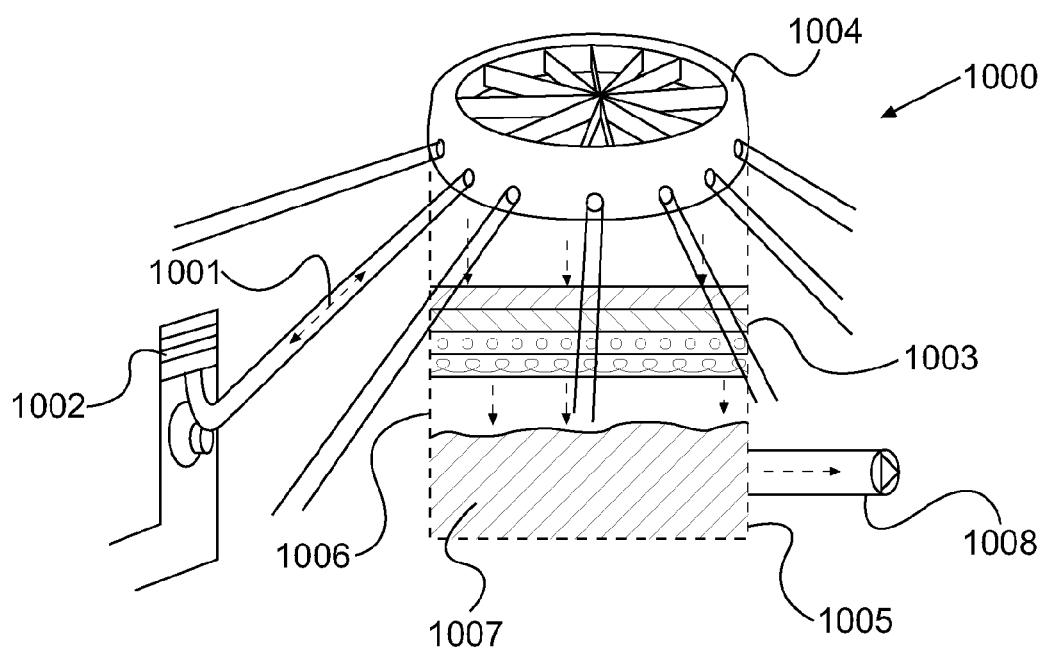
FIG. 19 is a schematic view of a device for capturing CO$_2$ from ambient air for subsequent processing.

FIG. 19 is a partial schematic drawing depicting a control device 1000 for capturing $CO_2$ from ambient air. The device utilizes air supplied from an urban storm drain system. Radial entry pipes 1001 from street curb grates 1002 to underground tunnels to create a pressure differential between the air inside the storm drain tunnel and the ambient street air at grate-level. In addition, the air treatment structure includes a $CO_2$ filter device 1003 located below a large fan 1004 which creates a low pressure region to draw down atmospheric air while simultaneously vacuuming-in traffic polluted street air in though pipes or ducts for cleaning purposes. Air-inlets at street level are existing drains used for ducting storm water run-off thru subterranean routes which in most cases converge at water treatment centers. It is desirable to use this existing system, if available, to route traffic polluted air and particulates to air treatment centers 1000 which may be adjacent to or a part of water treatment facilities. Airflow to the air treatment site via the storm drain is forced by the blade curvature of fan 1004 to be entrained by the more massive downward flowing atmospheric air through the filter stack 1003. The filter stack contents already described (FIG. 14) also contain activated charcoal. The continuously bathed filter is open to rain events with a dilute base and water spray accompaniment.

Below the fan and filter a catchment tank 1005 is located as a holding tank for recirculation back up through pipes (not shown), leading to spray ports above (not shown) which serve to drench incoming air from the atmosphere with its entrainment of street air heavily polluted with ozone, carbon dioxide, carbon monoxide, nitrates, sulfates, hydrocarbons, and heavy metals. Located between the holding tank solution and the filter stack is an air space 1006 that vents cleaned air first to a mist eliminator (not shown) and then to the atmosphere via ducts (not shown). The saturated water 1007 is distributed via pipeline 1008 or closed conduit to auxiliary separation tanks (not shown) for chemical treatment, sludge recovery, aggregate addition and heat treatment.

While the present invention has been described with respect to exemplary embodiments thereof, it will be understood by those of ordinary skill in the art that variations and modifications can be effected within the scope and spirit of the invention.

We claim:

1. A $CO_2$ control device for capturing $CO_2$ in ambient air, said control device comprising:
   a vertical flow-through apparatus through which the ambient air is designed to flow upwardly;
   an air driver system which drives the ambient air upwardly through the flow-through apparatus;
   a member with a large surface area to be treated with an alkaline material, said member being housed within the flow-through apparatus so that the ambient air driven by the air driver system flows through said member and $CO_2$ from the ambient air flow is absorbed by the alkaline material and turned into $CaCO_3$; and
   a liquid delivery system which delivers a water based alkaline treatment liquid to said member, said liquid delivery including
      a droplet producer which directs drops of the treatment liquid downwardly through the flow-through apparatus, onto said member, and downwardly through the ambient air flowing through said flow-through apparatus, so that the treatment liquid reacts with remaining $CO_2$ in the ambient air flow for absorption of $CO_2$ from the flue gas, and
      a reservoir below the droplet producer i) which collects treatment liquid sprayed from the droplet producer, ii) in which the treatment liquid is stored, and iii) from which the treatment liquid, when the treatment liquid becomes saturated with the absorbed $CO_2$, is removed for recycling or sequestration of the $CO_2$.

2. A $CO_2$ control device as claimed in claim 1, further comprising a processing center which combines the $CaCO_3$ with volcanic ash to form a cement material.

3. A $CO_2$ control device as claimed in claim 1, wherein the alkaline material comprises KOH or NaOH.

4. A $CO_2$ control device as claimed in claim 1, wherein said member is a $CO_2$ absorbing filter and wherein the spray system deposits the treatment liquid on the $CO_2$ filter to supply the $CO_2$ filter with the alkaline material.

5. A $CO_2$ control device as claimed in claim 4, wherein the $CO_2$ absorbing filter comprises a ceramic-woolen matrix.

6. A $CO_2$ control device as claimed in claim 4, wherein the $CO_2$ absorbing filter comprises silicon.

7. A $CO_2$ control device as claimed in claim 1, wherein said member is a reticulated surface area and wherein the spray system deposits the treatment liquid on the reticulated surface area to supply the reticulated surface area with the alkaline material.

8. A $CO_2$ control device as claimed in claim 1, wherein said air driver system includes a sunlight heated core and natural convection.

9. A $CO_2$ control device as claimed in claim 8, wherein droplet producer is sunlight heated steam generator.

10. A $CO_2$ control device as claimed in claim 1, wherein said air driver system is driven by a sunlight powered fan.

11. A $CO_2$ control device as claimed in claim 1, wherein said air driver system is driven by wave action of a body of water.

12. A $CO_2$ control device as claimed in claim 1, wherein said air driver system is driven by compression of a material by an automobile driven over the compressible material.

13. The $CO_2$ control device of claim 1,
wherein said flow-through apparatus, which is designed to be located in a body of water which has waves therein, further includes
a housing
a plurality of treatment chambers in said housing which are located one above another and in which the air is treated, and
a plurality of one way valves which are controlled to allow a one way flow of air from a lowermost one of the treatment chambers up through the remaining treatment chambers to an uppermost treatment chamber,
wherein said air driver system includes a driving chamber in said housing which is located below the lowermost treatment chamber and which has an opening positioned to receive waves of the body of water, whereby when a wave enters the driving chamber, a volume of the wave displaces a volume of ambient air in the driving chamber upwards through the one way valve in the lowermost treatment chamber, which, in turn, displaces the air through said one way valves in the remaining treatment chambers there above and finally out of the uppermost treatment chamber; and
wherein said member includes a respective plurality of $CO_2$ absorbing filters treated with an alkaline material and housed within a respective said treatment chamber, wherein $CO_2$ from the air is absorbed by the $CO_2$ absorbing filters as the air is displaced upwards through said chambers.

14. The device of claim 1, wherein said flow through apparatus includes a vertically oriented conical structure having a largest diameter at a base thereof.

15. A method of capturing $CO_2$ from ambient air, the method comprising the steps of:
driving ambient air through a $CO_2$ control device, the $CO_2$ control device including a vertical flow-through apparatus through which the ambient air flows upwardly;
absorbing the CO2 from the ambient air using a member having a large surface area, the member being housed within the flow-through apparatus so that the driven ambient air system flows through the member and $CO_2$ from the ambient air flow is absorbed, said absorbing step including the steps of
treating the member with an alkaline material by directing drops of a treatment liquid downwardly through the flow-through apparatus, onto the member, and downwardly through the ambient air flowing through the flow-through apparatus, so that the treatment liquid reacts with the $CO_2$ in the ambient air flow for absorption of $CO_2$ from the ambient air and so that the $CO_2$ absorbed by the alkaline material is then turned into $CaCO_3$; and
providing a reservoir i) in which the drops of liquid are collected, ii) in which the treatment liquid is stored, and iii) from which the treatment liquid, when the treatment liquid becomes saturated with the absorbed $CO_2$, is removed for recycling or sequestration of the $CO_2$.

16. A method of capturing $CO_2$ as claimed in claim 15, further including the step of combining the converted $CaCO_3$ with volcanic ash to form a cement material.

17. A method of capturing $CO_2$ as claimed in claim 15, wherein the member is a $CO_2$ absorbing filter, and wherein the treating step sprays the treatment liquid on the $CO_2$ filter to supply the $CO_2$ filter with the alkaline material.

18. A method of capturing $CO_2$ as claimed in claim 15, wherein the member is a reticulated surface area, and wherein the treating step sprays the treatment liquid on the reticulated surface area to supply the reticulated surface area with the alkaline material.

19. A method of capturing $CO_2$ as claimed in claim 15, wherein the alkaline material comprises KOH or NaOH.

20. A method of capturing $CO_2$ as claimed in claim 15, wherein the volcanic ash is pozzolana.

21. A method of capturing CO2 as claimed in claim 15, and further including the step of introducing the recycled treatment liquid into a body of water to promote algae growth therein.

* * * * *